United States Patent [19] [11] 4,234,205
Thiesce [45] Nov. 18, 1980

[54] SUSPENSION FOR INDEPENDENT VEHICLE WHEELS

[75] Inventor: Pierre Thiesce, Velizy, France

[73] Assignees: Societe Anonyme Automobiles Citroen; Automobiles Peugeot, both of France

[21] Appl. No.: 912,055

[22] Filed: Jun. 2, 1978

[30] Foreign Application Priority Data

Jun. 10, 1977 [FR] France .................. 77 17917

[51] Int. Cl.$^3$ .............................. B60G 11/20
[52] U.S. Cl. .................................. 280/723
[58] Field of Search ............ 280/721, 723; 267/11 R, 267/25, 57

[56] References Cited
U.S. PATENT DOCUMENTS 3,402,940  9/1968  De Castelet .................. 280/723

Primary Examiner—Robert R. Song
Assistant Examiner—Michael Mar
Attorney, Agent, or Firm—Irvin A. Lavine

[57] ABSTRACT

The present invention relates to a suspension for a set of wheels of a vehicle, in which the wheels are rotatably carried by the end of an axle arm of which the hub is mounted to rotate at the end of a cross member fast with the structure of the vehicle. According to the invention, the suspension is constituted by two torsion bars coupled for each of them between one of the arms and an element fast with the structure. Each torsion bar extends parallel to the axis of the hub and to the exterior thereof, and is immobilized in rotation by one of its ends on the corresponding arm and by the other of its ends on the element which is located in the vicinity of the other arm. The hub of each of the arms is movable in translation along its axis with respect to the cross member. The invention finds particular application to the automobile industry.

8 Claims, 4 Drawing Figures

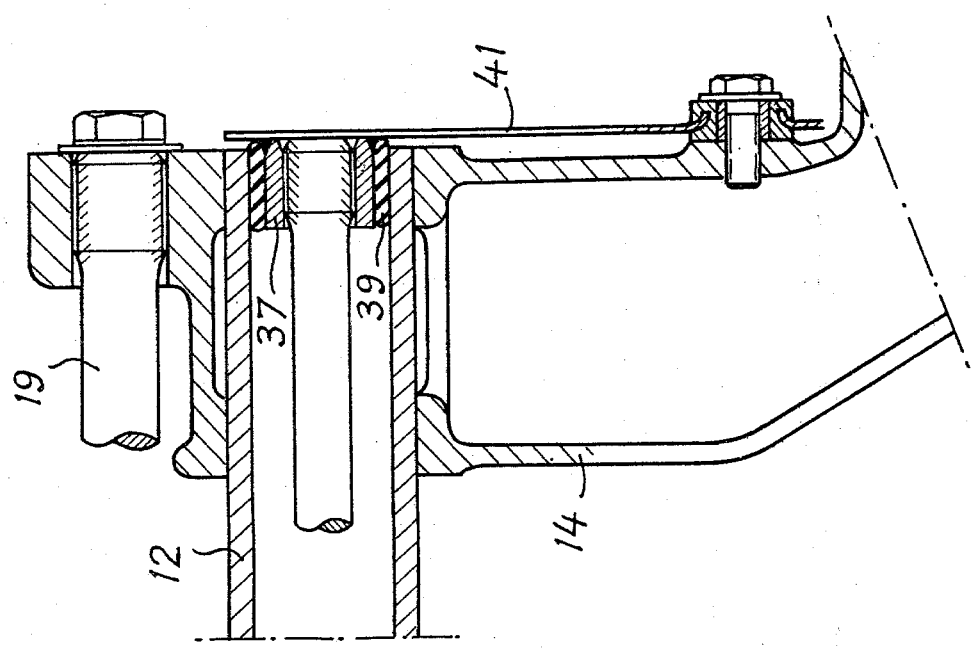
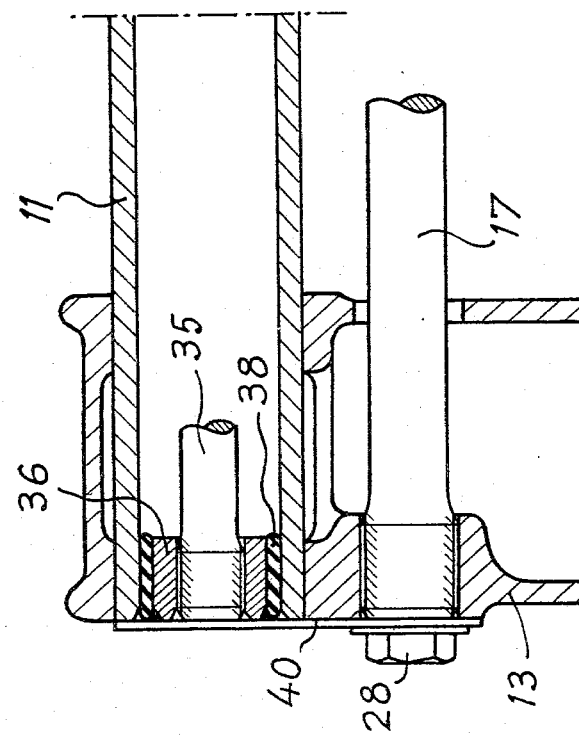
Fig. 4

SUSPENSION FOR INDEPENDENT VEHICLE WHEELS

The present invention relates to a suspension for vehicle wheels, particularly rear wheels, and mounted independently on substantially longitudinal arms, pivoted about transverse axes.

More precisely, the invention is concerned with the field of suspensions employing springs or torsion bars.

Suspensions are known, constituted for each wheel by a transverse torsion bar coaxial with respect to the axis of the hub of an axle arm and fast in rotation by one of its ends with said hub mounted to pivot on a chassis element and by its other end either with a fixed element of the chassis close to the longitudinal median axis of the vehicle, or with a chassis element located in the vicinity of the other axle arm.

These devices present several drawbacks. When the torsion bars are anchored in the vicinity of said median axis, therefore are relatively short, it is necessary to provide an axle arm of considerable length for the possible clearance of the wheel to be compatible with the elastic deformations of said bar. When the bars are anchored in the vicinity of the other axle arm, therefore relatively long, it is necessary to offset the axes of the hubs of arms longitudinally with respect to each other and subsequently to throw the wheels themselves out of line or to use arms of different lengths.

A first solution has been given to remedy these drawbacks. It consists in providing torsion bars offset with respect to the common axis of the wheel arm hubs. However, these bars are housed in these hubs and pass through them, this constituting highly complex manufacture and involves the production of large-dimension hubs necessitating bulky and expensive bearings. In addition, this arrangement is fragile as the bars, due to their offset with respect to the general axis of rotation of the arms, also work in flexion, which produces either prohibitive frictions or stresses undesirable in this type of installation.

Another solution consists in providing pivot bearings of the axle arm hubs borne laterally by the cross member and in placing the torsion bars outside these bearings. This arrangement involves a relatively bulky, complex cross member on which the assembly of the associated arms and bars is long and expensive.

Finally, suspensions are known in which the axle arm is pivoted directly outside the cross member and is immobilised axially with respect to said latter between, in particular, a shoulder which it bears and an outer lateral stop added to the cross member in the vicinity of one of the longitudinal side members of the vehicle. The torsion bars then extend between a lug fast with the axle arm and the opposite side member. One of the drawbacks of this device resides in the complexity of the assembly of the arms on the cross member which means that said latter must be dismountable with respect to the longitudinal side members of the frame.

It is an object of the present invention to remedy these drawbacks by proposing a novel type of suspension of the torsion bar type, which is very simple to manufacture and assemble, of small dimensions and consequently particularly adapted to relatively compact vehicles of reduced weight, intended for essentially town traffic.

To this end, the invention relates to a suspension for a set of wheels, in which each of the wheels is rotatably carried by the end of an axle arm of which the hub is mounted to rotate about a transverse axis in the vicinity of an end of a cross member fast with the structure of the vehicle, constituted by two torsion bars, each of the bars being anchored against rotation at its ends on one of said arms and on an element fast with said structure, located near the other arm and extending parallel to the axis of said hub and outside the cross member.

According to one of the features of the invention, the abovementioned arm hub is mobile in translation along its axis with respect to said cross member whilst said torsion bar is immobilised in rotation on said axle arm and on the corresponding element and thus constitutes means for transversely holding said axle arm with respect to the said structure.

In a preferred embodiment, the axial immobilisation of the torsion bar on the axle arm and the corresponding element is effected by grooved or notched joints under permanent torsion stress. In addition, the said joints are made in openings extending through said arms and elements, whilst at least one of the ends of each of the torsion bars extends outside at least one of said housings, the opening end constituting supports for means for adjusting, on assembly, the spacing of said arm with respect to said element. Furthermore, the said cross member is hollow and bears, inside, bearings for supporting and pivoting of the hubs of the arms introduced at the end of the cross member. It is advantageous to provide a cross member fast by its ends with said elements which are constituted by short side members coupled to the structure of the vehicle by means of elastic bearings.

In a first variant of this embodiment, the hubs of each of the axle arms are coupled in rotation by means of at least one sleeve which is coaxial thereto, possessing an elasticity in torsion about its axis and in shear along its axis.

In a second variant embodiment, each axle arm is coupled to the other in rotation by means of a stabilising torsion bar coaxial with respect to the hubs, the coupling of said bar with at least one of the arms being effected by a lever substantially perpendicular to the axis of the hubs and elastic in a direction parallel to this axis.

The invention will be more readily understood on reading the following description with reference to the accompanying drawings, in which:

FIG. 4 illustrates by a partial view in section a second variant embodiment of the detail of FIG. 3.

Figure 1:
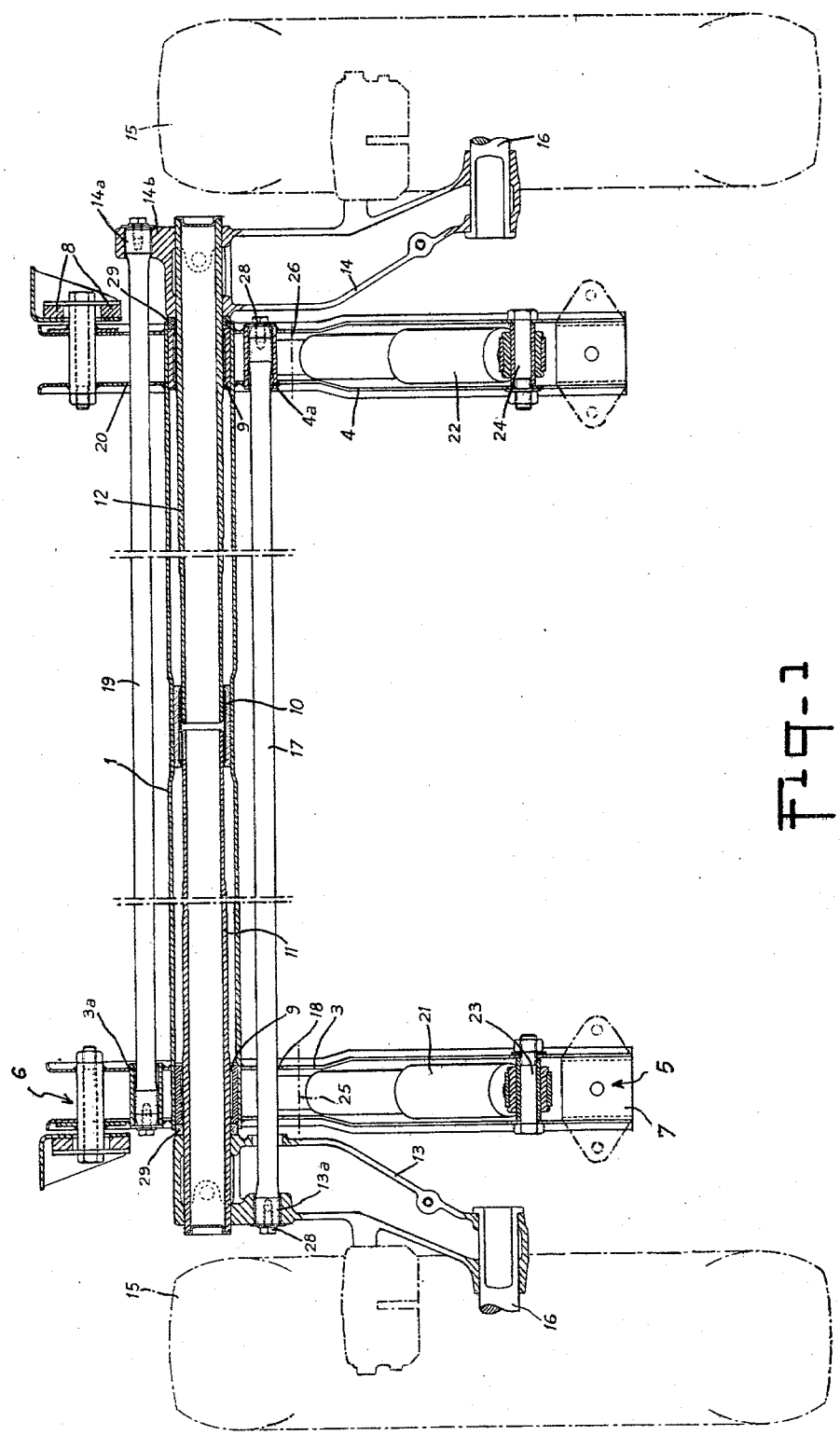
FIG. 1 is a view in section of a suspension according to the invention.
Figure 2:
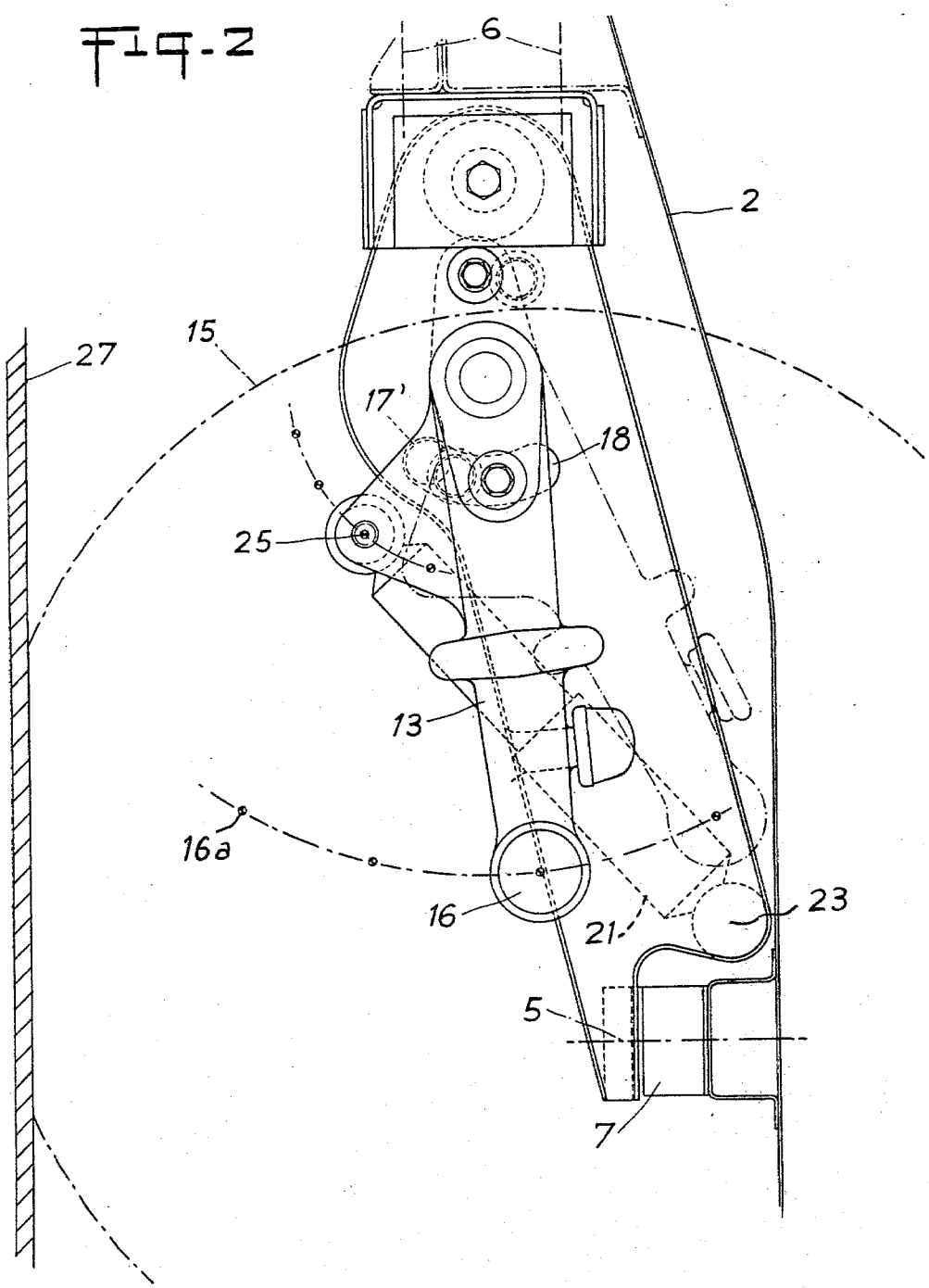
FIG. 2 is a side view of FIG. 1.

Referring firstly to FIGS. 1 and 2, they show a cross member 1 extending beneath the structure 2 of a vehicle and secured at its ends to two short side members 3 and 4 which are coupled to the structure of the vehicle at 5 and 6. It will be noted that these side members, coupled to the structure by means of fixing members such as screws (not shown) rest on elastic bearings 7 and 8 interposed between each side member and the structure.

The cross member 1 is hollow and comprises internal end and central bearings 9 and 10 respectively. These bearings support the hubs 11 and 12 of axle arms 13 and 14 which are mounted thereon, fitted by the end of the cross member and which remain free in rotation and in translation. The arms 13 and 14 bear at their end wheels 15 by means of spindles 16. It is seen that the arm 13 is close to side member 3 and the arm 14 is close to side member 4, to the exterior thereof.

A first torsion bar 17 grooved or notched at its two ends, extends parallel to the axis of the hubs 11 and 12, to the exterior thereof between the arm 13 and the side member 4. The grooved ends of the bar cooperate with grooved orifices 13a and 4a provided right through the arm 13 and the side member 4. The bar 17 passes through the side member 3 through an opening in the form of a concave slot 18.

Similarly, a second torsion bar 19, likewise grooved or notched at its ends, extends parallel to the axis of the hubs 11 and 12, to the exterior thereof and connects the arm 14 to the side member 3. Said ends of the bar are engaged in grooved openings 3a and 14a extending through, respectively, the side member 3 and an extension 14b of the arm 14. Finally, this bar 19 passes through a slot 20 in the side member 4. The two ends of each bar are preferably provided, in manner known per se, with a different number of grooves or notches to allow a precise angular adjustment of the arm.

Finally, FIGS. 1 and 2 schematically show shock absorbers 21 and 22, each being pivoted on the corresponding side member 3 and 4, at 23 and 24 respectively and on the adjacent arm 13, 14 about axes not shown in FIG. 1 but marked at 25 and 26 carried in overhang towards the inside of the vehicle by said arms.

The configuration of the elements constituting the suspension shown in these Figures is the one which they take when the vehicle rests on the ground 27 via its wheels 15. Now, the vehicle must be imagined not fitted with the torsion bars 17 and 19 and the structure 2 resting on blocks. In this situation, the axle arms 13 and 14 are placed by gravity in such a position that the axis of the wheel 15 and the spindle 16 lowers to 16a (FIG. 2). To put the torsion bar 17, for example, into position, it is firstly engaged in the slot 18 of side member 3 and in the grooved orifice 4a of the side member 4; then, by bending it so that its end located in the slot 18 is substantially in the position referenced 17', and by causing the arm 13 to pivot about the axis of its hub so as to place the grooved orifice 13a opposite the position 17' mentioned above, the grooved end of the bent torsion br is introduced into the orifice 13a. In this position, no torsion effort is applied to the bar, this signifying that the only friction efforts existing at the level of the grooves between the bar 17 and the parts 13 and 4, are due to the deformation in flexion of this bar. These efforts are relatively weak and easy to overcome as the bar is long and thin, so that, the ends of the bar 17 extending through orifices 4a and 13a, it is possible, by means of screws such as 28 and shims, to adjust the spacing of the arm 13 free in translation in the cross member 1 with respect to the side member 4. The procedure is the same for positioning the bar 19 between the side member 3 and the arm 14 and the arms are fitted with their respective wheel.

By causing the vehicle to rest thereafter on the ground via its wheels, the axle arms are loaded which, consequently, tend to pivot about the axis of their hub, in the direction of the alignment of the orifices 13a and 4a on the one hand and 14a and 3a on the other hand. In this movement, the torsion bars take a substantially rectilinear form, their flexion is reduced or annulled and the torsion stress which is applied thereto produces, at the level of the grooved joints, considerable friction forces. These friction forces are such that they ensure the relative immobilisation of the torsion bars of the side members and the axle arms. Thus, each torsion bar is a means of retaining, particularly in the transverse direction, the corresponding axle arm with respect to the chassis of the vehicle, any other supplementary fixing means advantageously being dispensed with. At the same time, the bars are slightly elongated since their camber due to the flexion of assembly is reabsorbed. As the hubs 11 and 12 are mounted to be free in translation in the cross member 1, the arms are separated from their initial position, by a value equal to the elongation of the bars. Account should therefore be taken of this lateral displacement of the arms during the loading of the vehicle both at the moment of assembly and the adjustments made and concerning the positioning of the seals protecting the bearings 9 and 10. Such seals 29 are shown in FIG. 1, made of an elastic material taking into account the axial movement of the hubs.

Figure 3:
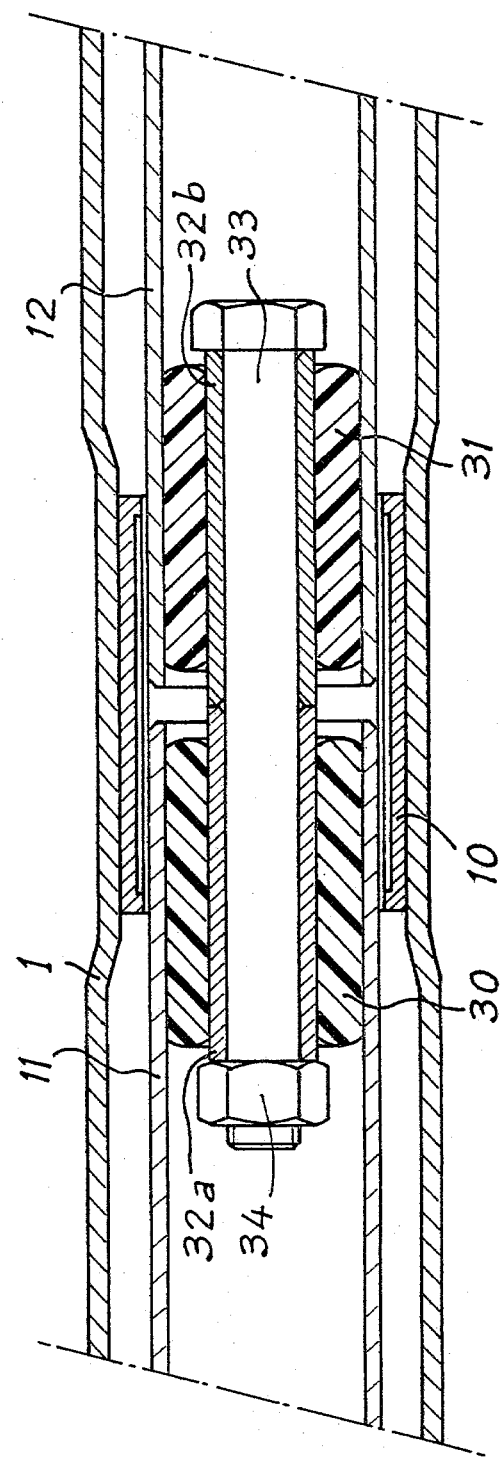
FIG. 3 illustrates by a partial view in section a first variant embodiment of a detail of the suspension according to the invention.

FIG. 3 shows a complementary arrangement of the suspension according to the invention illustrated in FIGS. 1 and 2, consisting in a coupling of the ends inside the cross member 1 of the hubs 11 and 12. The role of this coupling is to create a stabilising connection of the wheels which inhibits rolling or set to which the vehicle may be subjected. This connection is here produced by two elastic sleeves 30 and 31, fast in rotation and in translation, on the one hand respectively with the hub 11 and the hub 12, in the interior of said latter which are hollow and on the other hand with a central bush in two parts 32a and 32b coupled to each other by a screw 33 and a nut 34. The sleeves 30 and 31 are maintained in close contact with the pieces 11, 32a, 12, 32b, either by compression or by adhesion or gluing. These sleeves possess an elasticity in torsion so that any pivoting of one of the hubs creates a force of pivoting of the other hub in the same direction, for the purposes of lateral stabilisation of the vehicle, and an elasticity in shear in a direction parallel to the axis of the hubs to preserve the liberty of axial displacement of said latter, necessitated by the type of suspension according to the invention.

Finally, FIG. 4 shows a variant embodiment of the stabilisation described with reference to FIG. 3. This Figure shows the arms 13, 14 with their respective hub 11 and 12. A torsion bar 35 extends inside the hubs and is fast in rotation by its grooved ends with rings 36 and 37 centered in the hubs by means of elastic sleeves 38 and 39 and welded to one of the ends of two levers 40 and 41 themselves made fast respectively with the arms 13 and 14 by their other end. The lever 40 is relatively short with respect to the lever 41 and is coupled to the arm 13 by a screw 38 described with reference to FIG. 1.

The lever 41 is longer than lever 40. When the arm 13 pivots about its hub axis 11, it creates a torsion in the bar 35 by the lever 40 and the ring 36, which torsion reacts by the ring 37 on the lever 41 and the arm 14, tending to cause it to pivot in the same direction about its hub axis 12. As the arms 13 and 14 may move away from and closer to each other, whilst the bar 35 is of fixed length, the relative movement of the arms with respect to this bar along the axis of the hubs is allowed on the one hand by the elasticity to shear of the sleeves 38 and 39 and on the other hand by the elasticity which the lever 41 possesses in the direction parallel to the axis of the hub 12 due to its considerable length and its small thickness.

The present invention presents numerous advantages. Firstly, the assembly and dismantling of such a suspension is very simple and employs only a limited number of pieces which are easily accessible and easy to mass produce. The lateral stabilisation is also effected simply. The bulk and dimensions of such a suspension are reduced, this enabling the usable volume of the vehicle to be increased, particularly concerning the rear boot. Such a suspension makes it possible to position short axle arms which are particularly adapted for small vehicles and capable of ensuring a flexibility variable as a function of the angular clearance of the arms, therefore of the load of the vehicle. Finally, its cost price is low.

What is claimed is:

1. In a suspension for a set of independent wheels of a vehicle,
   a cross member fixed to the structure of the vehicle, transverse hub means,
   means supporting said hub means on said cross member for rotational and axial translational movement,
   an axle arm on each side of the vehicle and each having a first end connected to said hub means wherein said axle arms are axially movable to relative to said cross member,
   a pair of wheels, each rotatably supported adjacent a second end of a said axle arm,
   a pair of torsion bars spaced from the axis of said hub means and extending transversely of the vehicle, each having one end directly connected to a said axle arm and the other end connected to an element fixed to said structure,
   means connecting said torsion bar ends to said axle arms and said elements without rotation and without translation,
   whereby upon movement of a said axle arm about the axis of its hub means, said torsion bars will be subjected to torsion and flexion.

2. The suspension of claim 1, said last mentioned means comprising grooves on the ends of said bars.

3. The suspension of claim 1, wherein at least one end of each of said torsion bars extends outwardly of the element to which it is connected, and means on said one ends for laterally adjusting a said axle arm.

4. The suspension of claim 1, wherein said cross member is hollow, and bearing means inside said hollow cross member for supporting said hub means.

5. The suspension of claim 4, and further comprising a pair of short side members, means including elastic bearing means for connecting each said side member to the structure of the vehicle, and means for joining said cross member at the ends thereof to said side members.

6. The suspension of claim 5, and further including a shock absorber between each said axle arm and the adjacent short side.

7. The suspension of claim 1, wherein said hub means comprises a pair of hubs, and means for connecting said hubs for elastic torsional and shearing movement.

8. The suspension of claim 1, wherein said hub means comprises a pair of hollow hubs, a stabilizing torsion bar extending axially in said hollow hubs, and a lever extending transversely of said stabilizing torsion bar and connected at one end thereof to one end of said stabilizing torsion bar and at the other end thereof to a said axle arm, said lever being elastically deformable parallel to the axis of the hubs.

* * * * *